United States Patent Office 3,442,852
Patented May 6, 1969

3,442,852
HEAT- AND LIGHT-STABILIZED MOLDING COMPOSITIONS CONTAINING TIN STABILIZERS
Christoph Dorfelt, Burghausen (Salzach), and Werner Lorz, Gufflham, near Altotting, Germany, assignors to Farbwerke Hoechst Aktiengesellschaft vormals Meister Lucius & Bruning, Frankfurt am Main, Germany, a corporation of Germany
No Drawing. Filed May 5, 1966, Ser. No. 547,732
Claims priority, application Germany, May 21, 1965, F 46,113
Int. Cl. C08f *45/62;* C07d *7/22*
U.S. Cl. 260—45.75    3 Claims

ABSTRACT OF THE DISCLOSURE

An organotin stabilizing agent and molding compositions comprising a homopolymer or copolymer of viynl chloride utilizing an organotin stabilizing agent obtained by reacting a compound of the formula $$R-Sn-(X)_3$$

wherein R is a hydrocarbon; and X halogen, with a mixture of an alkali metal sulfide and (a) aliphatic alkali metal mercaptide or (b) an alkali metal salt of a saturated or unsaturated mono or polycarboxylic acid; effecting the preparation of the stabilizer at about 20–100° C. in an aqueous or organic solvent medium.

---

It is well known that vinyl chloride polymers or copolymers can be well stabilized against the action of light and heat by adding small amounts of organotin compounds and that sulfurcontaining organotin compounds are especially suitable. Recently dioctyltin derivatives of thiogylcollic acid esters are often used. These products are physiologically harmless (cf.Luijten and Pizarro, British Plastics (1957), pages 183–186) and therefore they can be used for stabilizing polyvinyl chloride articles which come into contact with foodstaffs, especially for transparent packaging films for foodstuffs.

Still further, it is known that condensation products (so-called stannonic acids or thiostannonic acids) obtained by reacting organotin trihalides of the general formula $RSnX_3$, wherein R stands for a monovalent organic radical and X means halogen, with alkali metal hydroxides, alkali metal sulfides or mixtures of alkali metal hydroxides and alkali metal sulfides are also well suitable as stabilizers for polyvinyl chloride and polyvinyl chloride copolymers. Products of this type are more effective as stabilizers than dioctyltin compounds so that smaller amounts are sufficient, their manufacture is cheaper and they are likewise physiologically harmless.

The present invention provides heat- and light-stabilized molding compositions on the basis of vinyl chloride polymers and copolymers containing organotin compounds in an amount in the range of from 0.05 to 5%, which organotin compounds are obtained by reacting organotin trihalides of the general formula $RSnHal_3$, in which R stands for an organic radical with 1 to 20 and preferably 1 to 8 carbon atoms and Hal means chlorine, bromine or iodine, with an equivalent amount, calculated on the halogen, of a mixture of alkali metal sulfide and (a) aliphatic alkali metal mercaptides or (b) alkali metal salts of mono- or polycarboxylic acids. The molding compositions according to the invention have a considerably improved stability compared with corresponding known molding compositions. The organotin stabilizers according to the invention are novel, they are physiologically harmless and their manufacture is more economic than that of known dioctyltin compounds.

The organotin compounds, which are contained in the molding compositions of the invention in an amount of from 0.05 to 5 and preferably 0.1 to 2.5% by weight, can be produced by reacting alkyltin trihalides with mixtures of alkali metal sulfide and alkali metal mercaptide or alkali metal salt of a carboxyilc acid in aqueous solution or in the presence of an organic solvent, for example benzene. In general, the reaction is performed at a temperature in the range of from 20 to at most 100° C. During the course of the reaction, which takes place with slight increase in temperature, the halogen atoms of the alkyltin trihalide are replaced by sulfur or carboxylic acid radicals or medcapto radicals. Alkali metal halide is formed as by-product and removed from the solution of the tin compound in an organic solvent by washing with water or filtration. The alkali metal compounds are used in an amount approximately equivalent to the amount of organotin trihalide used, that is to say that about one alkali metal atom is available for one hlogen atom.

The mixing proportion of alkali metal sulfide to alkali metal mercaptide or alkali metal salt of carboxylic acid can be largely varied and may be adapted to the type of polymer to be stabilized and the forming machine used (calendar, extruder and the like).

To produce the stabilizers according to the invention organotin trihalides carrying aliphatic, cycloaliphatic, araliphatic or aromatic radiacls, preferably hydrocarbon radicals with up to 20 carbon atoms can be used, for example methyltin trichloride, ethyltin trichloride, butyltin trichloride, hexyltin trichloride, octyltin trichloride, phenyltin trichloride, tolyltin trichloride, benzyltin trichloride, or cyclohexyltin trichloride. The best stabilizers are obtained with the use of aliphatically substituted organotin trichlorides. Instead of the chlorides the corresponding organotin tribromides or triiodides can also be used. Of course, it is preferred for economical reasons to use rather the chlorides than the bromides or iodide.

The most suitable alkali metal sulfide is sodium sulfide. Potassium sulfide or the sulfides of the other alkali metals can also be used but they are more expensive and difficult to obtain.

As mercaptides there can be used potassium or sodium mercaptide and also mercaptides of the other alkali metals. However, the sodium compounds are preferred owing to their lower price. They are prepared by reacting mercaptans in known manner with sodium hydroxide solution. Suitable aliphatic alkali metal mercaptides are especially those having up to 20 carbon atoms, for example ethylmercaptain, butylmercaptan, hexylmercaptan, n-octylmercaptan, 2-ethyl-hexyl-mercaptan, dodecyl-mercaptan, tetradecyl-mercaptan, octadecyl-mercaptan, or mixtures of different mercaptans, prepared for example from olefin mixtures.

Suitable alkali metal salts of mono- and polycarboxylic acids are the salts of saturated or unsaturated, aliphatic, cycloaliphatic, araliphatic, or aromatic mono- and polycarboxylic acids, such as acetic acid, acrylic acid, metacrylic acid, crotonic acid, levulinic acid, sorbic acid, 2-ethylhexylic acid, lauric acid, stearic acid, oleic acid, ricinoleic acid, fatty acid of linseed oil, benzoic acid, salicylic acid, or anthranilic acid; oxalic acid, malonic acid, succinic acid, maleic acid, glutaric acid, adipic acid, sebacic acid, phthalic acid, terephthalic acid, citric acid, or pyromellitic acid. It is advantageous to use carboxylic acids carrying one or several carboxyl groups on a saturated hydrocarbon radical or a hydrocarbon radical having one or several carbon-carbon double bonds and up to 20 carbon atoms. For economical reasons the sodium salts are preferred over potassium salts and the salts of other alkali metals.

The reaction products constitute mixtures of various substances the composition of which depends on the composition of the used mixture of alkali metal sulfide and alkali metal mercaptide or alkali metal salt of carboxylic acid, respectively. They contain certain amounts of thiostannonic acids of the formula $(R{-}Sn{-}S_{1.5})_n$ formed by reacting the organotin trihalide with alkali metal sulfide alone, as well as products formed by the reaction of the organotin trihalide with alkali metal mercaptide alone or alkali metal salt of carboxylic acid alone, which in the latter case do not contain sulfur.

With the use of alkali metal mercaptides the major portion of the reaction products generally consists of mixed condensation products in which the tin atom is bound to sulfur as well as to mercapto groups and which may have the following structures:

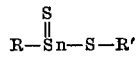

and

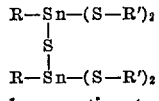

Products with 3 and more tin atoms linked by sulfur bridges may also form, for example, compounds of the formula

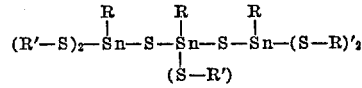

In the above formula R means the hydrocarbon radical which is directly bound to the tin atom via a carbon atom and R′ is the alkyl radical of the mercaptan. Analogous compounds in which —S—R′ of the above formulae is replaced by —O—CO—R′ are obtained by reacting alkyltin halide, alkali metal sulfide and alkali metal salts of carboxylic acids.

When alkali metal salts of polybasic carboxylic acids are used two tin atoms may also be linked together. With the use of alkali metal salts of dibasic carboxylic acids with the grouping —O—CO—R″—CO—O— there are obtained, for example, products of the formula

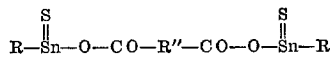

The excellent stabilizing effect of the specified organotin compounds is probably based on the presence of the mixed condensation products. This results from the fact that the mixture of a thiostannonic acid prepared from organotin trichloride and alkali metal sulfide with the sulfur-free reaction product of organotin trichloride and the alkali metal salt of a carboxylic acid has a poorer stabilizing effect than the mixed condensation product made from the same constituents by reacting the organotin trichloride with a mixture of alkali metal sulfide and alkali metal salt of a carboxylic acid. The corresponding organotin trimercaptides, formed by direct reaction of organotin trihalides with alkali metal mercaptides and mixtures thereof with thiostannonic acids are also inferior in their stabilizing effect to the mixed condensation products according to the invention. It is remarkable, however, that the mixtures of thiostannonic acids with the aforesaid sulfur-free carboxylic acid derivatives, as well as mixtures of thiostannonic acids with organotin trimercaptides are more effective than the individual components of the mixtures.

The especially good stabilizing action of mono-organotin compounds in which three valences of the tin atom that are not bound to carbon atoms are linked partially to sulfur and partially to mercapto radicals or carboxylic acid radicals has been unknown up to now and could not have been foreseen.

The novel stabilizers can be used for homo- and copolymers of vinyl chloride and for mixtures preponderantly containing vinyl chloride polymers. As components for the copolymers there are mentioned, vinyl acetate, vinylidene chloride, vinyl stearate, acrylic acid ester, maleic acid ester or mixtures of the said monomers.

Suitable components of mixtures containing vinyl chloride polymers are synthetic rubbers (copolymers of butadiene with styrene or acrylonitrile) and chlorinated or sulfochlorinated olfins or mixtures thereof.

The organotin stabilizers according to the invention can be used either alone or in combination with known organotin stabilizers or other stabilizers, for example epoxides, with antioxidants, gelation agents, UV adsorbents, light protecting agents, fillers, dyestuffs, lubricating agents and agents with antistatic action.

The following examples serve to illustrate the invention but they are not intended to limit it thereto.

EXAMPLE 1

Polyvinyl chloride produced by the suspension process was mixed with 1% by weight of modified montan wax as lubricating agent and 0.2% by weight of various stabilizers or stabilizer mixtures and the compositions obtained were rolled on mixing rolls at 180° C. until the sheet became black or stuck to the rolls. The time required to feed the composition to the mixing rolls up through the blackening or sticking is described as a measure of thermostability. The results indicated in the following Table I were obtained.

Table I

| Stabilizer used (percent): | Thermostability (minutes) |
|---|---|
| 0.2 dioctyltin-diisooctylthioglycolate | 5 |
| 0.2 butylthiostannonic acid | 25 |
| 0.2 butyltin-tridodecylmercaptide | 20 |
| 0.2 mixed condensation product I | 42 |
| 0.2 mixture II | 34 |
| 0.2 mixed condensation product III | 40 |
| 0.3 mixed condensation product IV | 35 |
| 0.2 mixed condensation product V | 41 |
| 0.2 mixed condensation product VI | 40 |

The mixed condensation products and mixtures indicated in Table I were prepared as follows:

Mixed condensation product I.—In a glass flask a solution of 40.4 grams of dodecyl mercaptan in 300 milliliters of benzene was stirred with 40 grams of sodium hydroxide solution of 20% strength, the mixture was heated to boil and the water was removed from the reaction vessel by distilling it off as an azeotropic mixture with benzene. The suspension of dodecyl-sodium mercaptide remaining in the flask was admixed, while continuously stirring, with 48 grams of $Na_2S \cdot 9H_2O$ and 56.4 grams of butyltin trichloride were gradually added drop by drop. The water was again removed by azeotropic distillation with benzene and the benzenic solution of the organotin compound was separated from the precipitated sodium chloride by filtration. The benzene was evaporated and the monobutyltin compounds were obtained in the form of a light oil in a yield of 80 grams.

*Analysis.*—Sn, 28.7%; S, 15.4%.

Mixture II.—(a) In a glass flask 40.4 grams of dodecyl mercaptan were dissolved in 300 milliliters of benzene and the solution was stirred with 40 grams of sodium hydroxide solution of 20% strength. The mixture was boiled, the water was removed as described above by azeotropic distillation with benzene, the mixture was cooled and 18.8 grams of butyltin trichloride were dropped into the suspension of the mercaptide obtained. The mixture was heated for a further hour with reflux and while stirring the precipitated sodium chloride was filtered off and from the filtrate the benzene was evaporated. 51.1 grams of butyltin tridodecylmercaptide were obtained in the form of a light oil.

*Analysis.*—Calculated for $C_{40}H_{84}S_3Sn$: Sn, 15.1%; S, 12.0%. Found: Sn, 15.2%; S, 12.3%.

(b) 48 grams of $Na_2S \cdot 9H_2O$ were dissolved in 60 milliliters of water and the solution obtained was mixed while stirring with a solution of 37.6 grams of butyltin trichloride in 100 milliliters of water. The temperature of the mixture rose from 20 to 35° C. and butylthiostannonic acid precipitated in the form of a white deposit. The mixture was stirred for a further hour at room temperature, the reaction product was filtered off with suction, washed with water until it was free from sodium chloride and dried. Yield: 29.5 grams of a white fine powder.

Analysis.—Calculated for $C_8H_{18}Sn_2S_3$: Sn 52.7%; S, 21.4%. Found: Sn, 53.1%; S, 21.5%.

The butyltin tridodecylmercaptide prepared as described sub (a) was intimately mixed with the butylthiostannonic acid prepared as described sub (b). The mixture was prepared with the same amounts of butyltin trichloride, sodium dodecylmercaptide and sodium sulfide as the mixed condensation product I. Owing to the separate preparation of trimercaptide and thiostannonic acid it did not contain, however, any mixed condensation product in which one and the same tin atom was linked to sulfur and the mercapto radical.

Mixed condensation product III.—110.4 grams of a mixture of alkylmercaptans having 16 to 18 carbon atoms (mean molecular weight 276) were dissolved in a glass flask in 1800 milliliters of benzene and the solution was stirred with a solution of 16 grams of NaOH in 64 milliliters of water. The mixture was heated to boil and the water was removed by azeotropic distillation with benzene. The sodium mercaptide precipitated in the reaction vessel in the form of a white deposit. When the water was removed the mixture was cooled and, while continuously stirring, there were added first 96 grams of $Na_2S \cdot 9H_2O$ and then slowly 112.8 grams of butyltin trichloride. The temperature rose from 20 to 25° C. The mixture was again heated to boil and the water was removed by azeotropic distillation. The organotin compound obtained was soluble in benzene. The undissolved sodium chloride was filtered off. The benzene was evaporated and 187 grams of monobutyltin compounds were obtained in the form of a waxy composition.

Analysis.—Sn, 24.3%; S, 13.1%.

Mixed condensation product IV.—55.2 grams of an alkylmercaptan mixture prepared from olefins and having a mean molecular weight of 276 were dissolved in 900 milliliters of benzene, stirred in a glass flask with 40 grams of sodium hydroxide solution of 20% strength and heated to boil. The water was removed by azeotropic distillation with benzene, the reaction mixture was cooled to room temperature and 48 grams of $Na_2S \cdot 9H_2O$ and 48 grams of methyltin trichloride were added while continuously stirring, whereby the temperature rose from 20 to 28° C. The mixture was boiled, the water was removed by azeotropic distillation with benzene, the benzenic solution was filtered off from precipitated sodium chloride and the benzene of the filtrate was evaporated. 82 grams of monomethyltin compounds were obtained as residue in the form of a waxy composition.

Analysis.—Sn, 26.9%; S, 14.5%.

Mixed condensation product V.—A solution of 80.8 grams of dodecylmercaptan in 800 milliliters of benzene was boiled in a glass flask with 80 grams of sodium hydroxide solution of 20% strength and the water was removed by azeotropic distillation with benzene. The mixture was cooled, 24 grams of $Na_2S \cdot 9H_2O$ and 67.6 grams of n-octyltin trichloride were added successively, the mixture was boiled again and the water was removed by azeotropic distillation with benzene. The benzenic solution of the organotin products was filtered off from the precipitated sodium chloride and the benzene was evaporated. 124 grams of monoocytyltin compounds were obtained in the form of a waxy composition.

Analysis.—Sn, 18.0%; S, 12.1%.

Mixed condensation product VI.—A solution of 24.2 grams of dodecylmercaptain in 800 milliliters of benzene was mixed with 24 grams of sodium hydroxide solution of 20% strength, the mixture was boiled and the water was removed by azeotropic distillation with benzene. The suspension of dodecylsodiummercaptide remaining in the reaction vessel was cooled and while stirring 129.6 grams of $Na_2S \cdot 9H_2O$ and 112.9 grams of butyltin chloride were added successively. The mixture was boiled again, the water was removed by azeotropic distillation, the benzenic solution was filtered and the benzene was distilled off. 106.5 grams monobutyltin compounds remained behind in the form of a solid composition.

Analysis.—Sn, 42.2%; S, 19.2%.

Table I reveals that mixed condensation products I, III, IV, V and VI have a considerably better stabilizing effect than the known stabilizers dioctyltin-di-isooctylthioglycolate, butyl thiostannonic acid and butyltin tridodecylmercaptide. Mixture II of thiostannonic acid and trimercaptide is also superior in its effect to the known stabilizers, but it does not reach the efficacy of the mixed condensation products.

EXAMPLE 2

In order to determine the rolling stability with higher amounts of stabilizer a suspension polyvinyl chloride was mixed with 1% of lubricant on the basis of montan way and the amounts indicated in the following Table II of various stabilizers were added. The mixtures were rolled on mixing rollers heated at 180° C. until they turned distinctly black or stuck to the rolls. The results obtained are also indicated in Table II.

Table II shows that the mixed condensation products used in Example I have a better stabilizing effect even in an amount of 0.6% than the known stabilizers dioctyltin-di-isooctylthioglycolate, and di-n-octyltin-dimercapto-benzthiazolate, although the latter are used in an amount of 1.5%.

TABLE II

| Stabilizer used | Color of rolled sheet after 10 minutes | First color change after, minutes | Blackening or sticking after, minutes |
| --- | --- | --- | --- |
| 1.5% dioctyltin-di-isooctyl-thioglycolate | Colorless | 15 | 65 |
| 1.5% di-n-octyltin-dimercaptobenzthiazolate | Yellow | (¹) | 30 |
| 0.6% mixed condensation product I | Colorless | 30 | 75 |
| 0.6% mixed condensation product III | do | 25 | 70 |
| 0.6% mixed condensation product IV | do | 35 | 75 |
| 0.6% mixed condensation product V | do | 30 | 70 |
| 0.6% mixed condensation product VI | do | 30 | 70 |

¹ Immediately after beginning.

EXAMPLE 3

In order to determine the rolling stability a polymer of vinyl chloride prepared by the suspension process was mixed with 1% by weight of a modified montan way as lubricant and 0.2 and 0.6%, respectively, of the substances to be tested as stabilizers, and the mixtures were rolled on a mixing roll at 180° C. until the sheet turned black or stuck to the rolls. The time from feeding the mixture to the rolls to the occurrence of the blackening or sticking is designated as thermostability. A further criterion for the evaluation of the stabilizer to be tested is the color of the sheet or the color change in dependence of the rolling time.

Various organotin compounds were tested which had been obtained by reacting organotin trihalides with mixtures of alkali metal sulfides and alkali metal salts of carboxylic acids. The results obtained are listed in the following Table III. It can be seen that the novel products have a considerably better stabilizing effect in amounts of 0.2 and 0.6% only than the known stabilizers di-n-octyltin diisooctylthioglycolate and butyltin thiostannonic acid. The stabilizing effect of mixture II of monobutyltin maleate and butylthiostannonic acid is also superior to that of these two substances but it does not reach the values of the mixed condensation product I made from the same starting materials.

Mixed condensation product I.—29.4 grams of maleic anhydride were stirred in a glass flask for 30 minutes with 300 milliliters of benzene and a solution of 24 grams of NaOH in 48 milliliters of water. 72 grams of $$Na_2S \cdot 9H_2O$$

were added while continuously stirring and then 112.9 grams of butyltin trichloride were slowly poured in. The temperature rose from 25 to 62° C. The mixture was boiled and the water in the reaction vessel was expelled by azeotropic distillation with benzene. The benzene was evaporated and the residue was extracted with chloroform. The organotin compound was dissolved and filtered off from the insoluble sodium chloride. After evaporation of the chloroform a mixture of the butyltin compounds was obtained as a white powder and in a yield of 103 grams.

*Analysis.*—Sn, 42.0%; S, 8.5%.

stannonic acid separated as a white precipitate. The mixture was stirred for a further hour, the reaction product was filtered off with suction, washed with water until it was free with sodium chloride and dried. 44.2 grams of a white powder were obtained.

*Analysis.*—Calculated for $C_8H_{18}Sn_2S_3$: Sn, 52.8%; S, 21.4%. Found: Sn, 53.1%; S, 21.5%.

The monobutyltin maleate obtained as described sub (a) was initmately mixed with the butylthiostannonic acid obtained as described sub (b). The mixture was made of the same amounts of butylin trichloride, sodium maleate and sodium sulfide as the mixed condensation product I, however, owing to the separate preparation of butyltin maleate and butylthiostnnonic acid, it did not contain mixed condensation products in which the tin atoms were bound to sulfur as well as maleic acid radicals.

Mixed condensation product III.—A solution of 480 grams of $Na_2S.9H_2O$ and 276 grams of sodium levulate in 2 liters of water was gradually admixed while stirring with a solution of 564.4 grams of butyltin trichloride in 4 liters of water. The temperature rose from 20 to 32° C. and the monobutyltin product separated in the form of a white deposit. To complete the reaction the mixture was stirred for a further hour at 80° C., filtered with suction, the sodium chloride formed as by-product was washed out with water and the reaction product was dried, 581 grams of a fine white powder were obtained.

*Analysis.*—Sn, 37.0%; S, 10.1%.

Mixed condensation product IV.—In a stirred flask 77.4 grams of crotonic acid were dissolved in 900 milliliters of 1 N sodium hydroxide solution and while stirring 108 grams of $Na_2S \cdot 9H_2O$ were added. The clear solution

TABLE III

| Stabilizer used | Color of rolled sheet after 10 minutes | First color change after, minutes | Blackening or sticking after, minutes |
| --- | --- | --- | --- |
| 0.2% di-n-oltyltin-di-isooctylthioglycolate | Red brown | (1) | 5 |
| 0.2% butylthiostannonic acid | Colorless | 15–20 | 25 |
| 0.2% mixed condensation product I | do | 25 | 43 |
| 0.2% mixture II | Yellowish | (1) | 35 |
| 0.2% mixed condesnation product III | Colorless | 30 | 40 |
| 0.2% mixed condensation product IV | do | 15 | 45 |
| 0.2% mixed condensation product VI | do | 15 | 35 |
| 0.2% mixed condensation product VII | do | 20 | 30 |
| 0.2% mixed condensation product VIII | do | 25 | 35 |
| 0.2% mixed condensation product IX | do | 25 | 40 |
| 0.2% mixed condensation product X | do | 30 | 40 |
| 0.2% mixed condensation product XI | do | 25 | 30 |
| 0.2% mixed condensation product XII | do | 25 | 35 |
| 0.2% mixed condensation product XIII | do | 25 | 40 |
| 0.2% mixed condensation product XIV | do | 25 | 40 |
| 0.6% di-n-octyltin-di-isooctylthioglycolate | Yellowish | (1) | 35 |
| 0.6% mixed condensation product I | Colorless | 30 | 60 |
| 0.6% mixed condensation product IV | do | 10 | 60 |
| 0.6% mixed condensation product V | do | 25 | 55 |
| 0.6% mixed condensation product X | do | 30 | 70 |
| 0.6% mixed condensation product XII | do | 30 | 50 |
| 0.6% mixed condensation product XIII | do | 30 | 60 |
| 0.6% mixed condensation product XIV | do | 25 | 55 |

[1] Immediately after beginning of rolling.

Mixture II.—(a) 29.4 grams of maleic anhydride were stirred with 200 milliliters of benzene and a solution of 24 grams of NaOH in 60 milliliters of water. The water was removed by azeotropic distillation with benzene and 56.4 grams of butyltin trichloride were gradually added to the suspension of sodium maleate obtained. The mixture was stirred for a further hour at 40 to 50° C., the benzene was evaporated and the residue was extracted with chloroform while cold. The organotin compound dissolved and the sodium chloride formed in the reaction remained behind. The chloroform was evaporated and 63 grams of monobutyltin maleate were obtained as a white powder.

*Analysis.*—Calculated for $C_{10}H_{12}O_6Sn$: Sn 34.7%. Found: Sn 34.2%.

(b) 72 grams of $Na_2S \cdot 9H_2O$ were dissolved in 100 milliliters of $H_2O$ and the solution obtained was gradually mixed while stirring with a solution of 56.4 grams of butyltin trichloride in 70 milliliters of water. The temperature of the mixture rose from 20 to 32° C. and butylthioobtained was slowly mixed while stirring with a solution of 169.2 grams of butyltin trichloride in 900 milliliters of water. The mixture was stirred for one hour, the reaction product which had separated in the form of a white precipitate was filtered off with suction, washed with water until it was free from sodium chloride and dried. 178 grams of a white powder were obtained.

*Analysis.*—Sn, 36.5%; S, 7.1%.

Mixed condensation product V.—600 milliliters of 1 N sodium hydroxide solution were stirred with 120 grams of lauric acid and 72 grams of $Na_2S \cdot 9H_2O$. A solution of 112.9 grams of butyltin trichloride was dropped into the mixture while continuously stirring, whereby the temperature rose from 22 to 31° C. The mixture was stirred for a short while, the semiliquid reaction product was separated from the aqueous phase by extraction with chloroform and the solvent was evaporated. 192 grams of monobutyltin compounds were obtained in the form of a yellowish, pasty substance.

*Analysis.*—Sn, 24.0%; S, 5.1%.

Mixed condensation product VI.—An aqueous solution of sodium salicylate, obtained by mixing 82.8 grams of salicylic acid with 600 milliliters of 1 N sodium hydroxide solution, was stirred in a glass flask with 144 grams of $Na_2S \cdot 9H_2O$ and 200 milliliters of water. The clear solution obtained was slowly admixed while stirring with 169.3 grams of butyltin trichloride dissolved in 900 milliliters of water. The monobutyltin compounds separated in the form of a white precipitate, which was filtered off with suction, freed from sodium chloride by washing it with water and dried. 186 grams of a white powder were obtained.

Analysis.—Sn, 34.6%; S, 8.9%.

Mixed condensation product VII.—The product was prepared in the same manner as product VI with the exception that instead of salicylic acid 82.2 grams of anthranilic acid were used. 183 grams of monobutyltin compounds were obtained in the form of a loose white powder.

Analysis.—Sn, 34.9%; S, 9.4%.

Mixed condenastion product VIII.—A solution of sodium succinate was prepared by mixing 47.2 grams of succinic acid with 800 milliliters of 1 N sodium hydroxide solution, 192 grams of $Na_2S \cdot 9H_2O$ were added and the clear soltuion obtained was slowly mixed while stirring with a solution of 225.8 grams of butyltin trichloride in 1200 milliliters of water. The mixture was stirred for a further hour at 60° C., the precipitated white monobutyltin compound was filtered off with suction, washed with water until it was free from sodium chloride and dried. 191 grams of a fine white powder were obtained.

Analysis.—Sn, 44.4%; S, 12.1%.

Mixed condensation product IX.—The product was prepared in the same manner as product VIII with the exception that 52.8 grams of glutaric acid were used instead of succinic acid. 199 grams of monobutyltin compounds were obtained in the form of a white powder.

Analysis.—Sn, 43.8%; S, 12.1%.

Mixed condensation product X.—In a glass flask 58.4 grams of adipic acid were stirred with 400 milliliters of 2 N sodium hydrocide solution, 192 grams of $Na_2S \cdot 9H_2O$, and 250 milliliters of water.

Into the clear aqueous soltuion of disodium adipate and sodium sulfide a solution of 225.8 grams of butyltin trichloride in 1200 milliliters of water was poured while continuously stirring. The temperature rose from 20 to 31° C. and a mixture of monobutyltin compounds separated in the form of a white insoluble powder. The reaction mixture was stirred for some time at 80° C., the reaction product was filtered off with suction, washed with water until it was free from sodium chloride and dried. 209.5 grams of a dusty white powder were obtained.

Analysis.—Sn, 42.5%; S, 11.7%.

Mixed condensation product XI.—An aqueous solution of disodium terephthalate was prepared from 33.2 grams of terephthalic acid and 400 milliliters of 1 N sodium hydroxide solution, the solution was mixed with 96 grams of $Na_2S \cdot 9H_2O$ and 180 milliliters of water and while stirring a solution of 112.9 grams of butyltin trichloride in 600 milliliters of water was slowly added. The reaction product separated in the form of a white precipitate. It was stirred for a further hour, filtered off with suction, washer with water until it was free from sodium chloride and dried. 112 grams of a mixture of monobutyltin compounds were obtained in the form of a white powder.

Analysis.— Sn, 41.2%; S, 10.8%.

Mixed condensation product XII.—In a glass flask 58.4 grams af adipic acid were stirred with 800 milliliters of 1 N sodium hydroxide solution and 192 grams of $Na_2S \cdot 9H_2O$ The aqueous clear solution obtained by mixed drop by drop while stirring with a solution of 192.2 grams of methyltin trichloride in 1200 milliliters of water. The temperature rose from 20 to 32° C. and a mixture of methyltin compounds separated in the form of a white precipitate. The reaction mixture was stirred for one hour at 80° C., filtered off with suction, the sodium chloride was removed by washing with water, and the reaction product was dried. 168 grams of a white loose powder were obtained.

Analysis.—Sn, 50.4%, S, 13.8%.

Mixed condensation product XIII.—An aqueous solution of sodium adipate and sodium sulfide was prepared as described above by mixing 58.4 grams of adipic acid, 800 milliliters of 1 N sodium hydroxide solution and 192 grams of $Na_2S \cdot 9H_2O$ and the solution was slowly mixed while stirring with 270.6 grams of n-octyltin trichloride. The temperature rose slightly and a mixture of monooctyltin compounds separated as a white powder. After stirring for a short while the powder was filtered off with suction, washed until it was free from sodium hydroxide and dried. The yield amounted to 242 grams.

Analysis.—Sn, 35.8%; S, 9.7%.

Mixed condensation product XIV.—A solution of 11.4 grams of disodium adipate in 250 milliliters of water was mixed with 129.6 grams of $Na_2S \cdot 9H_2O$ and to the clear solution obtained a solution of 112.9 grams of butyltin trichloride in 600 milliliters of water was added while stirring. The temperature rose from 20 to 35° C. The reaction product separated in the form of a white precipitate which was filtered off with suction, washed with water and dried. 91 grams of a white loose powder were obtained.

Analysis.—Sn, 49.9%; S, 18.3%.

What is claimed is:

1. A molding composition comprising a homopolymer or copolymer of vinyl chloride and 0.05–5% by weight, based on the composition, of a stabilizer obtained by reacting a compound of the formula $$R—Sn—(X)_3$$

wherein R is a hydrocarbon radical of 1–20 carbon atoms and X is a halogen atom; with a mixture of an alkali metal sulfide plus (a) an aliphatic alkali metal mercaptide, or (b) an alkali metal salt of a mono- or polycarboxylic acid in which the acyl moiety is saturated or unsaturated hydrocarbon-carbonyl; the tin halide and alkali metal reactants being present in the such ratio as to provide one alkali metal atom per halogen atom; effecting the reaction at a temperature of about 20–100° C. in an aqueous or organic solvent medium.

2. The composition of claim 1 wherein the vinyl chloride polymer consists of a vinyl chloride homopolymer or copolymer of vinyl chloride with a member selected from the group consisting of vinyl acetate, acrylonitrile and styrene.

3. The composition of claim 1 wherein R is a hydrocarbon of 1–8 carbon atoms.

References Cited

UNITED STATES PATENTS

| | | | |
|---|---|---|---|
| 2,763,632 | 9/1956 | Johnson | 260—45.75 |
| 3,284,383 | 11/1966 | Proops | 260—18 |
| 2,914,506 | 11/1959 | Mack | 260—45.75 |

DONALD E. CZAJA, *Primary Examiner.*

H. E. TAYLOR, JR., *Assistant Examiner.*

U.S. Cl. X.R.

99—163; 252—406; 260—28.5, 429.7